United States Patent
Narendran et al.

(10) Patent No.: US 8,400,971 B1
(45) Date of Patent: Mar. 19, 2013

(54) RECLAMATION OF EV-DO SESSIONS BASED ON LATENCY-SENSITIVITY

(75) Inventors: Rajveen Narendran, Olathe, KS (US); Andrew M. Wurtenberger, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1432 days.

(21) Appl. No.: 11/972,558

(22) Filed: Jan. 10, 2008

(51) Int. Cl.
*H04W 4/00* (2009.01)

(52) U.S. Cl. ........ 370/329; 370/229; 370/230; 370/335; 370/342

(58) Field of Classification Search .................. 370/229, 370/230, 329, 335, 342
See application file for complete search history.

(56) References Cited

U.S. PATENT DOCUMENTS

| | | | | |
|---|---|---|---|---|
| 5,764,645 | A * | 6/1998 | Bernet et al. | 370/395.52 |
| 6,115,390 | A * | 9/2000 | Chuah | 370/443 |
| 6,690,929 | B1 * | 2/2004 | Yeh | 455/406 |
| 7,359,971 | B2 * | 4/2008 | Jorgensen | 709/226 |
| 2005/0128963 | A1 * | 6/2005 | Gazda et al. | 370/278 |
| 2007/0097861 | A1 * | 5/2007 | Wilde et al. | 370/229 |
| 2008/0253383 | A1 * | 10/2008 | Sehgal et al. | 370/401 |

OTHER PUBLICATIONS

Unpublished U.S. Appl. No. 11/536,098, filed Sep. 28, 2006, in the name of Narendran et al.

* cited by examiner

*Primary Examiner* — Dang Ton
*Assistant Examiner* — Robert M Morlan

(57) ABSTRACT

Methods and systems are provided for implementing reclamation of EV-DO sessions based on latency-sensitivity. In an embodiment, an EV-DO access node (e.g. an RNC) maintains a plurality of sessions respectively associated with a plurality of access terminals. The plurality of sessions consists of a first number of sessions, each having an associated degree of latency-sensitivity. The access node compares the first number with a session-reclamation threshold. If the access node determines that the first number exceeds the session-reclamation threshold, the access node responsively reclaims one or more of the sessions that have been inactive for at least a threshold amount of time in ascending order of latency-sensitivity, without notifying the one or more associated access terminals.

19 Claims, 3 Drawing Sheets

RECLAMATION OF EV-DO SESSIONS BASED ON LATENCY-SENSITIVITY

BACKGROUND

1. Technical Field

The present invention relates to wireless communications and, more particularly, to management of coverage areas by access nodes in wireless communication systems.

2. Description of Related Art a. EV-DO Generally

Many people use mobile stations, such as cell phones and personal digital assistants (PDAs), to communicate with cellular wireless networks. These mobile stations and networks typically communicate with each other over a radio frequency (RF) air interface according to a wireless communication protocol such as Code Division Multiple Access (CDMA), perhaps in conformance with one or more industry specifications such as IS-95 and IS-2000. Wireless networks that operate according to these specifications are often referred to as "1xRTT networks" (or "1x networks" for short), which stands for "Single Carrier Radio Transmission Technology." These networks typically provide communication services such as voice, Short Message Service (SMS) messaging, and packet-data communication.

Recently, service providers have introduced mobile stations and wireless networks that communicate using a protocol known as EV-DO, which stands for "Evolution Data Optimized." EV-DO networks, operating in conformance with industry specification IS-856, provide high rate packet-data service (including Voice over IP (VoIP) service) to mobile stations using a combination of time-division multiplexing (TDM) on the forward link (from the network to mobile stations) and CDMA technology on the reverse link (from mobile stations to the network). Furthermore, some mobile stations, known as hybrid mobile stations or hybrid access terminals, can communicate with both 1x networks and EV-DO networks.

In the EV-DO context, a mobile station is typically referred to as an access terminal, while the network entity with which the access terminal communicates over the air interface is known as an access node. The access node typically includes a device known as a radio network controller (RNC), which is similar to a base station controller (BSC) in 1x networks. The access node also includes one or more base transceiver stations (BTSs) or "Node-Bs," each of which include one or more antennas that radiate to define respective wireless coverage areas. Among other functions, the RNC controls one or more BTSs, and acts as a conduit between the BTSs and an entity known as a packet data serving node (PDSN), which provides access to a packet-data network. Thus, when positioned in one of these wireless coverage areas, an access terminal may communicate over the packet-data network via the access node and the PDSN.

b. Session Negotiation

To initiate connectivity, an access terminal requests what is known as a Universal Access Terminal Identifier (UATI) from an access node. The access node may respond by granting the access terminal a UATI, which then serves to identify the access terminal to the access node for some period of time. After acquiring a UATI, the access terminal will typically communicate with the access node over the air interface to set up what is referred to as a "session." Essentially, an access terminal that has a session with an access node can engage in packet-data communication over the packet-data network to which the access node and the PDSN provide access. Conversely, an access terminal that does not have a session with an access node can not engage in packet-data communication over the packet-data network.

As part of setting up the session, the access terminal sends a connection request to the access node, requesting an air-interface connection. The access node will responsively work to establish the air-interface connection with the access terminal, which involves the access node instructing the access terminal to communicate with the access node over what is known as a traffic channel. This traffic channel takes the form of particular timeslots on the forward link, during which the access node sends data to the access terminal, and a particular CDMA channel on the reverse link, over which the access terminal sends data to the access node.

In addition to establishing the connection with the access terminal, the access node takes a number of other actions, one of which is to validate that the access terminal is authorized to engage in communication via the access node. Another such action is to set up a radio-packet (e.g., A10/A11) connection between the access node and the PDSN for the access terminal. The access node also facilitates establishment of a data link (e.g., a point-to-point protocol (PPP) connection) between the access terminal and the PDSN. Furthermore, an entity such as the PDSN or a Mobile-IP home agent assigns an IP address to the access terminal.

Once session negotiation (described further below) is complete, the access terminal has a session with the access node, and can therefore communicate over the packet-data network via the access node and the PDSN. Typically, the air-interface connection is then torn down (i.e. the access terminal goes from active to dormant), freeing up those resources for other access terminals. Both the network and the access terminal maintain data pertaining to the rest of what was established, however, including the IP address, radio-packet connection, and data link; in particular, the access terminal has a session (i.e. session data) maintained for it by the RNC.

Thereafter, if the access terminal wants to initiate packet-data communication, it sends another connection request to the access node, which then assigns a traffic channel to the access terminal. If the access node receives data addressed to the access terminal, the access node typically sends a page to the access terminal over a paging channel, and assigns a traffic channel to the access terminal. The access terminal can then communicate over the packet-data network, using the traffic channel, IP address, radio-packet connection, and data link.

c. Packet-Flow Types, Profile IDs, and Quality of Service (QoS) in EV-DO

In addition to VoIP communication, access terminals frequently engage in other types of packet-data communication, such as instant messaging (IM) and web browsing, among many types. Each instance of an access terminal engaging in a type of packet-data communication for a period of time may be deemed a "packet flow," which would typically involve IP packets being sent and received by the access terminal. For example, a given VoIP call may be referred to as a VoIP packet flow. Thus, as examples, an access terminal may engage in VoIP packet flows, IM packet flows, push-to-talk (PTT) packet flows, streaming-audio packet flows, streaming-video packet flows, video-telephony packet flows, best-effort packet flows such as web-browsing and file-transfer-protocol (FTP) packet flows, and/or any other type(s).

To address the fact that access terminals engage in these various types of packet flows, a particular revision of EV-DO specifications, known as IS-856, Rev. A ("EV-DO-A"), provides for what are known as profile IDs, which are identifiers associated on a one-to-one basis with certain types of packet flows. IS-856, Revision A and IS-856, Release 0 are hereby incorporated herein by reference. Thus, one profile ID may be associated with VoIP packet flows, while another may be associated with PTT packet flows, and so on. Best-efforts packet flows typically do not have an associated profile ID, though they certainly could. And again, access terminals typically are able to engage in more than one type of packet flow, meaning that they can engage in one or more best-efforts packet flows and/or one or more profile-ID-associated packet flows. During (and typically near the end of) session negotiation, which may take on the order of four or five seconds (or longer), the access node and the access terminal negotiate a set of what are known as "personalities" for the access terminal. In particular, an access terminal and an access node may negotiate approximately five personalities, each of which is essentially a communication profile that is associated with a particular release or revision of IS-856, as well as with more specific functionality, and is often correlated with different types of packet flows having differing qualities of service (QoS). In general, providing a particular level of QoS essentially means providing a particular level of packet-forwarding (or "expedited-forwarding") treatment to certain packet flows. Note that applying QoS is also known as "traffic shaping" or "DiffServ" ("differentiated services"), and is known in the art.

Once personality negotiation is complete, the access node and the access terminal then negotiate a set of profile IDs for the access terminal to use during the session; in other words, they agree as to the types of packet flows in which the access terminal is capable of engaging and in which the access terminal is permitted to engage during the session. During the session, when the access terminal is communicating via the access node according to the agreed-upon set of profile IDs, and in particular as part of setting up a packet flow, either the access terminal or the access node, or both, may send the other a message known as a ReservationOnRequest (RoR), which may include at least one profile ID, indicating the type of requested packet flow.

Once an RoR has been sent and acknowledged, the access terminal has an "open reservation" on the assigned traffic channel. This open reservation is associated with any profile IDs that were included in the RoR; in other words, the open reservation is associated with the type of packet flow in which the access terminal is able to engage. Note that an access terminal may have more than one open reservation on a traffic channel at one time, corresponding to the fact that the access terminal can engage in more than one packet flow at one time.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Overview

Figure 1:
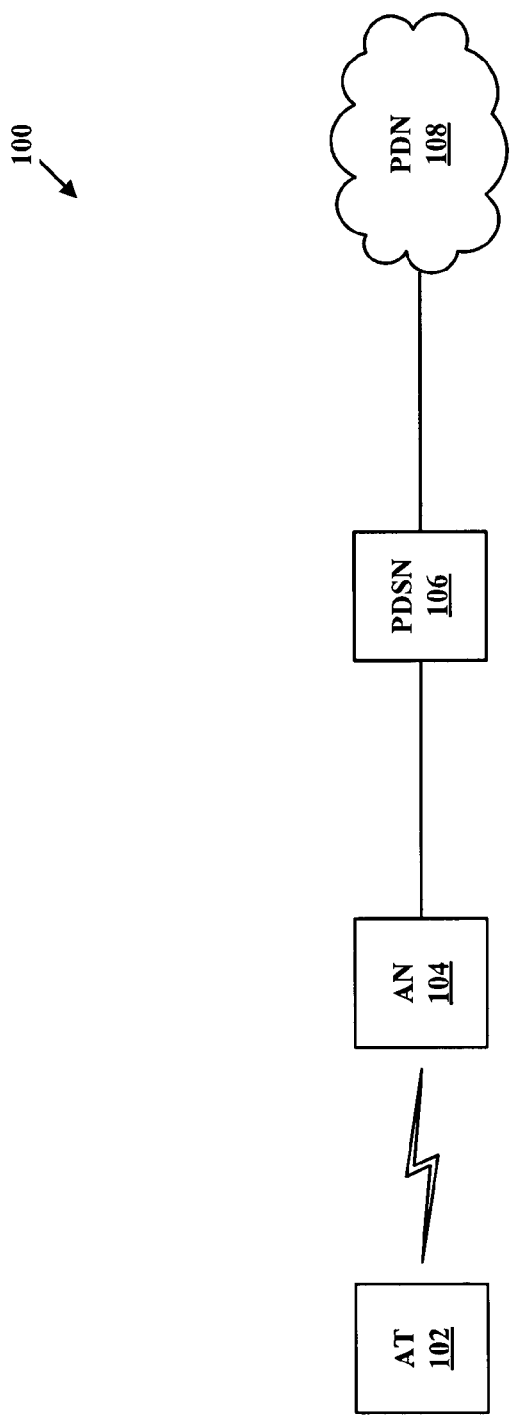
FIG. 1 is a simplified block diagram of a communication system, in accordance with exemplary embodiments.

There is typically a one-to-one relationship between (i) sessions being maintained by the RNC and (ii) UATIs currently assigned by the RNC; furthermore, each session requires some amount of data storage on the RNC to store one or more identifiers (e.g. mobile identification number (MIN), mobile equipment identifier (MEID), electronic serial number (ESN), network access identifier (NAI), username, password, etc.) of the associated access terminal, one or more session parameters (e.g. profile IDs), and/or any other data deemed necessary or desirable to store in association with a given session on the RNC. And RNCs are networking devices having data storage that is not unlimited. As such, sessions are a valuable and limited resource on a given RNC (i.e. on a given access node).

As UATIs are assigned to—and sessions are maintained for—more and more users, the RNC—absent some mechanism to handle this problem—may get to a point where it cannot add any additional sessions, and thus some users may end up getting blocked from communicating via the RNC (i.e. access node). One known approach for dealing with this is to upgrade the RNC to provide for increased capacity; this is not at all dynamic (i.e. it would not solve the problem of an RNC experiencing heavier-than-normal load unless and until the hardware upgrade is actually completed), and it comes with costs in terms of the upgraded hardware, potential downtime, the labor of installation and maintenance, etc.

Another known approach is for the RNC to reclaim sessions according to a least-recently-used (LRU) algorithm, which may be as follows: first reclaim idle sessions (i.e. those that were set up but have never been used for any substantive packet-data communication), then reclaim semi-dormant sessions (i.e. those that have been used for some substantive packet-data communication, though not recently), and if still necessary, move to reclaiming dormant sessions (i.e. those that don't currently have an assigned traffic channel (i.e. are not currently being used) but that have recently been used for some substantive packet-data communication). Note that reclaiming a given session typically involves deleting session data, marking session data as invalid, freeing an associated UATI, and/or taking one or more other steps.

According to the invention, when the number of sessions maintained by an RNC (i.e. access node) reaches a threshold value, such that session reclamation is indicated, the RNC reclaims sessions that have gone unused for a specified period of time, without notification to the corresponding access terminal (as such notification would result in an effectively-immediate request from that access terminal for a new UATI/session, which would counteract any progress made by the reclamation). Furthermore, according to the invention, the access node will reclaim non-recently-used sessions in ascending order of latency-sensitivity, such that best-effort sessions may be reclaimed first, while highly latency-sensitive sessions such as push-to-talk (PTT) sessions may be reclaimed only as a last resort, as having to negotiate a new session would be particularly disruptive to such highly latency-sensitive sessions.

The order of session latency-sensitivity—used for carrying out embodiments of the present invention—may be determined with reference to the profile IDs negotiated in connection with each respective session during session negotiation. That is, various profile IDs (i.e. packet-flow types) generally indicate or are associated with varying degrees of latency-sensitivity, in direct proportion to any QoS requirements they have; the absence of a profile ID (i.e. best efforts) is associated with essentially no latency-sensitivity and no QoS demands. Thus, best-efforts packet flows may be considered the least latency-sensitive, while PTT packet flows may be among the most latency-sensitive (i.e. have relatively stringent QoS requirements).

In general, best-efforts packet flows and profile-ID packet flows may each be associated with an appropriate respective level of latency-sensitivity. As such, in some embodiments, the access node (e.g. RNC) may categorize sessions into tiers of latency-sensitivity according to the most latency-sensitive profile ID among the sessions' respective sets of negotiated profile IDs (if any). In other embodiments, the access node may use the most latency-sensitive profile ID associated with an RoR sent to or from the associated access terminal (i.e. with a reservation made in connection with the access terminal) during the session. In other embodiments, the access node may use the most latency-sensitive packet flow actually engaged in by the associated access terminal during the session. And other categorization schemes are possible as well, including but not limited to those based on negotiated and/or actually-used personalities.

In any event, once determining that some sessions need to be reclaimed because the number of sessions being maintained is too high (i.e. exceeds a threshold number), the access node reclaims sessions in ascending order of latency-sensitivity among those sessions that have not been used in a least a threshold amount of time. As one example, the access node may start by reclaiming best-effort sessions, move to low-priority QoS sessions, then streaming sessions, then VoIP sessions, then PTT sessions, etc. And these packet-flow types and this order are just examples of course.

With respect to how many sessions to reclaim once it has been decided to reclaim some, many examples are possible. In one embodiment, the access node may reclaim only enough to bring the number of maintained sessions down to or just below the threshold that triggered the reclamation. This may be seem as a minimally disruptive strategy from the access terminals' point of view, but may not be efficient from the access node's point of view, since sessions will be being reclaimed on a substantially continuous basis, which may ultimately inure to the detriment of the access terminals. In other embodiments, the access node may reclaim a set number of sessions. In other embodiments, the access node may reclaim all sessions in a first tier of latency-sensitivity, then all in the next tier, etc., perhaps until surpassing a minimum number of reclaimed sessions. And many other strategies are possible.

In general, reclamation of a session includes revoking a UATI that was granted to an associated access terminal, as well as deleting or marking as invalid any maintained session data. The revocation of the UATI makes it available to other access terminals that thereafter request one from the access node. The reclamation of the session frees up resources—such as memory and processing power—that were allocated to maintaining the session for access terminals that had not been using them very recently. Note that these access terminals, to the extent they are even still nearby and powered on, will each operate as if they have a valid UATI and session with the access node, and thus will not further monopolize UATI and session resources by immediately and repeatedly requesting a new UATI, which they would normally do upon notification of UATI revocation. Or at least they will not request a UATI nearly as often.

As stated, when a session is reclaimed, if the associated access terminal's user wants to engage in further communication, the access terminal would need to negotiate a new session, which again may take on the order of four or five seconds, or perhaps longer. This is less than ideal—to say the least—for latency-sensitive packet flows such as VoIP and PTT. In general, the latency-sensitivity of certain types of packet flows is among the motivations behind using profile IDs to accomplish different levels of QoS in EV-DO-A in the first place, thus giving higher priority to specific types of packet flows, as defined in the standards document known in the art as 3GPP2 C.R1001-E, which is hereby incorporated herein by reference.

More particularly, voice-related packet flows such as PTT are given specific profile IDs within a defined numeric range. All voice-related packet flows that are sensitive to setup-time delay use profile IDs 1280 through 1283, inclusive, for their signaling. An assignment of packet-flow types to these profile IDs as defined in 3GPP2 C.R1001-E is shown below:

1280—Conversational Media Control Signaling (VoIP)
1281—Streaming Media Control Signaling (Video)
1282—Interactive Media Control Signaling (PTT Video)
1283—PTT Media Control Signaling (PTT)

Thus, according to the present invention, when the RNC reaches a threshold where it decides that it needs to begin reclaiming sessions, it will do so in ascending order of a predetermined hierarchy of latency-sensitivity. For example, it may be decided to order the above-listed profile IDs in the following order of ascending latency-sensitivity: {1281, 1282, 1280, 1283}. Thus, to the extent all of this reclamation is necessary, the RNC may reclaim best-efforts sessions (i.e. those without any negotiated profile IDs), first and then, based on the profile IDs above, and assuming these are the only profile IDs in play, move to reclaiming sessions associated with profile ID 1281 (and none of the others), then sessions associated with 1282 (and neither 1280 nor 1283), then sessions associated with 1280 (and not 1283), and finally reclaim sessions associated with 1283 as a last resort. And this is clearly only an example.

In all of this, the RNC is preferably only reclaiming sessions that have been inactive for a threshold amount of time. Note that there could be a single threshold amount of time associated with all tiers of latency-sensitivity, or there could be different threshold amounts of time, each associated with one or more of the tiers. And other suitable arrangements are possible as well, without departing from the scope and spirit of the present invention.

2. Exemplary Architecture a. Exemplary Communication System

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes an access terminal 102, an access node 104, a PDSN 106, and a packet-data network (PDN) 108. Note that additional entities not depicted in FIG. 1 could be present as well. As an example, there could be more than one access terminal in communication with access node 104; furthermore, there could be additional entities in communication with PDN 108. Also, there could be one or more devices and/or networks making up at least part of one or more of the communication links depicted in FIG. 1. As an example, there could be one or more routers, switches, or other devices or networks on the link between PDSN 106 and PDN 108.

Access terminal 102 may be any mobile device arranged to carry out the access-terminal functions described herein. Access terminal 102 may include a user interface, a wireless-communication interface, a processor, and data storage comprising instructions executable by the processor for carrying out those access-terminal functions. The user interface may include buttons, a touch-screen, a microphone, and/or any other elements for receiving inputs, as well as a speaker, one or more displays, and/or any other elements for communicating outputs.

The wireless-communication interface may comprise an antenna and a chipset for communicating with one or more access nodes over an air interface. As an example, the chipset could be suitable for engaging in EV-DO (Rel. 0 and/or Rev. A) communications. The chipset or wireless-communication interface in general may also be able to communicate with a CDMA network, a Wi-Fi network, and/or one or more additional types of wireless networks. The processor and data storage may be any suitable components known to those of skill in the art. As examples, access terminal 102 could be or include a cell phone, a PDA, a computer, a laptop, an air card, a hybrid IS-2000/IS-856 device, and/or a multi-mode Wi-Fi/cellular device.

Access node 104 may be any one or any combination of network elements arranged to carry out the access-node functions described herein. As such, access node 104 may include a communication interface, a processor, and data storage comprising instructions executable by the processor to carry out those access-node functions. The communication interface may include one or more antennas and chipsets or other components for providing one or more EV-DO coverage areas such as cells or sectors, for communicating with access terminals such as access terminal 102. The communication interface may also include a wired packet-data interface such as an Ethernet interface for communicating directly or over one or more networks with PDSN 106. Access node 104 may include one or more base transceiver stations (BTSs) (or "Node-Bs"), as well as one or more radio network controllers (RNCs).

PDSN 106 may be any networking server or other device arranged to carry out the PDSN functions described herein. As such, PDSN 106 may include a communication interface, a processor, and data storage comprising instructions executable by the processor for carrying out those PDSN functions. The communication interface may include a wired packet-data interface such as an Ethernet interface for communicating with access node 104 and over PDN 108. Note that, instead or in addition, PDSN 106 may comprise a wireless interface for communicating with access node 104 and over PDN 108. And PDSN 106 may use the same interface or separate interfaces for communicating with access node 104 and for communicating over PDN 108.

PDN 108 may include one or more wide area networks, one or more local area networks, one or more public networks such as the Internet, one or more private networks, one or more wired networks, one or more wireless networks, and/or one or more networks of any other variety. Devices in communication with PDN 108 may exchange data using a packet-switched protocol such as IP, and may be identified by an address such as an IP address.

3. Exemplary Operation a. A First Exemplary Method

Figure 2:
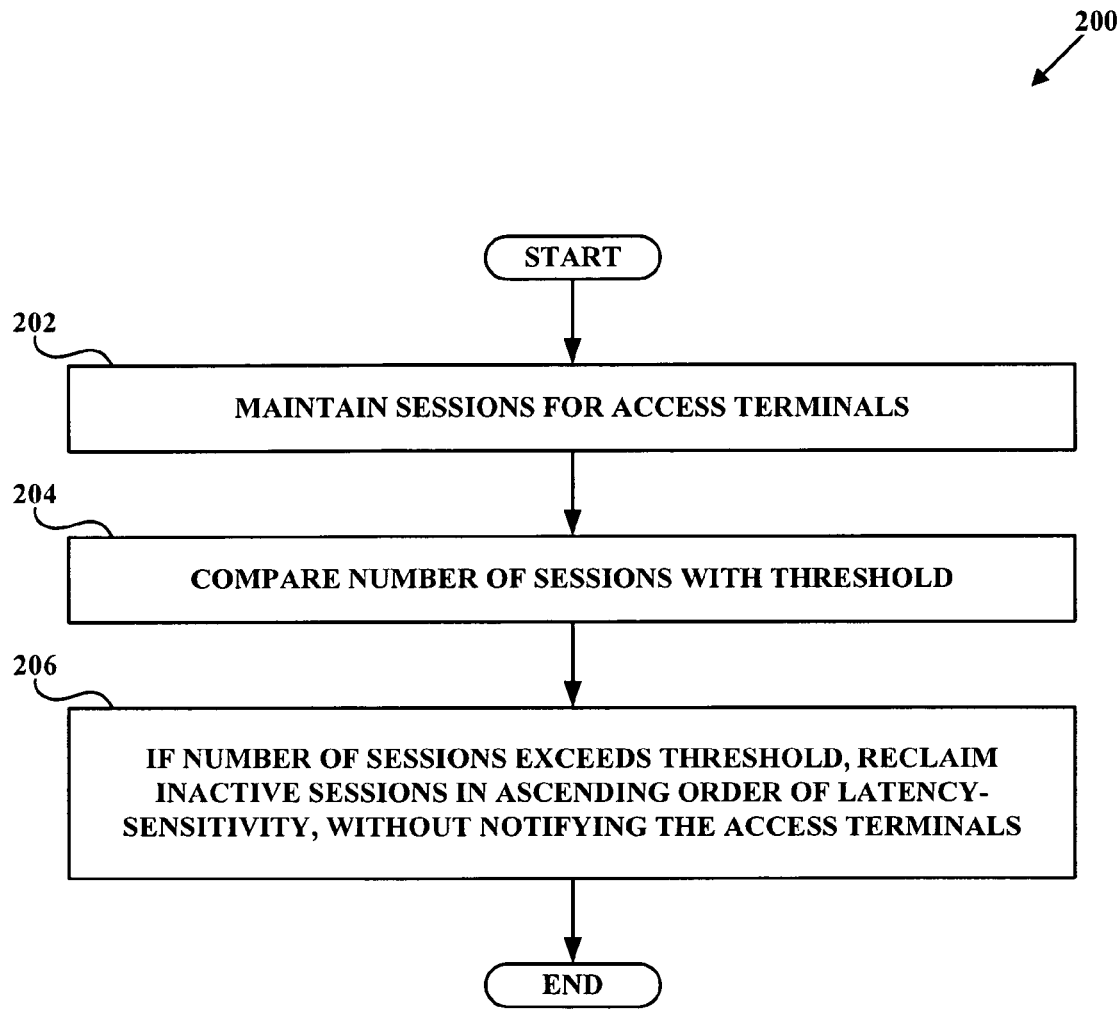
FIG. 2 is a flowchart of a method, in accordance with exemplary embodiments.

FIG. 2 depicts a flowchart of an exemplary method, in accordance with an exemplary embodiment. As shown in FIG. 2, method 200 begins at step 202, when access node 104 maintains a plurality of sessions respectively associated with a plurality of access terminals. The plurality of sessions consists of a first number of sessions, each having an associated degree of latency-sensitivity. At step 204, access node 104 compares the first number with a session-reclamation threshold. At step 206, access node 104 determines that the first number exceeds the session-reclamation threshold, and responsively reclaims one or more of the sessions that have been inactive for at least a threshold amount of time in ascending order of latency-sensitivity, without notifying the one or more associated access terminals. These steps are further explained in the following subsections.

Note that method 200 is described as being carried out by access node 104, which is an EV-DO access node. However, the method 200 could be carried out by some other entity or combination of entities. Furthermore, the access terminals for which access node 104 maintains sessions are preferably EV-DO access terminals. Note that either or both of the access node 104 and the access terminals (such as access terminal 102) may operate in compliance with (a) IS-856, Revision A or (b) both IS-856, Release 0 and IS-856, Revision A. Also, as explained, access node 104 may include an RNC and at least one BTS. And one or more of the access terminals may include at least one of a cellular telephone, a personal digital assistant, a computer, a laptop computer, a laptop air card, and a hybrid access terminal.

i. Maintain Sessions for Access Terminals

At step 202, access node 104 maintains a plurality of sessions respectively associated with a plurality of access terminals such as access terminal 102. The plurality of sessions consists of a first number of sessions, each having an associated degree of latency-sensitivity.

Step 202 may involve conducting the session-negotiation process described above with respect to each access terminal for which a session is maintained. And access node 104 may assign a UATI to each access terminal in connection with each session, and maintain session data associated with that UATI. The session data for a given session may include one or more static or dynamic identifiers of the associated access terminal (e.g. MIN, MEID, ESN, NAI, username, password, IP address, etc.), one or more personalities, one or more profile IDs, and/or one or more of any other suitable types of data values. The access terminals may uses these sessions to make reservations and engage in packet flows as is known in the art.

Access node 104 may maintain at all times a current count of the number of maintained sessions. Furthermore, each session having an associated degree of latency-sensitivity may well take either an implicit or explicit form. If explicit, access node 104 may store a latency-sensitivity value or score in association with each session, perhaps based on negotiated profile IDs or actually-engaged-in packet flows, or any of the other potential criteria mentioned herein or suitable for a particular implementation. Access node 104 may store separate lists of different tiers of latency-sensitive sessions, or perhaps use some other tallying strategy. If implicit, access node 104 may, for example, just store the negotiated profile IDs and then be able to, at the time session reclamation becomes warranted, assess the latency-sensitivity of each session. And other examples are possible as well without departing from the invention.

ii. Compare Number of Sessions with Threshold

At step 204, access node 104 compares the first number (i.e. the number of sessions currently being maintained) with a session-reclamation threshold. Access node 104 may be provisioned with this threshold, and it may be updateable from time to time. In one embodiment, access node 104 may be able to maintain 40,000 sessions; in that case, a suitable session-reclamation threshold might be 36,000 sessions. As stated, access node 104 may keep track of the current number of maintained sessions, and access node may then periodically compare that current number with the threshold number, to determine whether session reclamation is needed.

iii. If Necessary, Reclaim Sessions in Ascending Order of Latency-Sensitivity without Notifying the Associated Access Terminals At step 206, access node 104 determines that the number of sessions currently being maintained exceeds the session-reclamation threshold, and responsively reclaims one or more of the sessions that have been inactive for at least a threshold amount of time in ascending order of latency-sensitivity, without notifying the one or more associated access terminals. Access node 104 may use timestamps associated with packet-flow activity to determine which sessions have been inactive for at least the threshold amount of time. Access node 104 may also continuously sort sessions according to how recently they have engaged in substantive packet-data communication (i.e. communication occurring after initial session negotiation, involving either or both of best-efforts packet flows and profile-ID-associated packet flows). Or access node 104 may use some other suitable methodology for determining which sessions have been inactive for at least the threshold amount of time.

Note that reclaiming a given session may involve taking one or more of the following actions: revoking a UATI associated with the given session, deleting session data associated with the given session, and marking as invalid session data associated with the given session. One or more steps other than these may be involved instead or in addition. And note as well that this is done without notification to the associated access terminals, to avoid having those access terminals substantially immediately request a new UATI/session and immediately begin to erode any gains made by implementation of the present invention.

With respect to implementing the reclamation of long-inactive sessions in ascending order of latency-sensitivity, this may take a variety of forms. One aspect of this reclamation may involve first reclaiming best-efforts sessions, as those sessions generally by definition have no QoS requirements. Another aspect, perhaps following best-efforts reclamations, may involve reclaiming one or more sessions in an order determined by the most latency-sensitive profile ID associated with each respective session. This latter aspect would apply to sessions having at least one associated profile ID, and may be conducted in tiers as described above. Step 206 may instead or in addition involve reclaiming one or more sessions in an order determined by the most latency-sensitive reservation associated with each respective session, or perhaps in an order determined by the most latency-sensitive packet flow actually engaged in by the access terminal associated with each respective session.

As a general matter, step 206 preferably involves reclaiming any best-efforts sessions before reclaiming any voice-related sessions (such as VoIP, PTT, and/or video-telephony sessions). Within voice-related sessions, step 206 preferably involves reclaiming any VoIP sessions before reclaiming any PTT sessions. Step 206 furthermore preferably involves (a) reclaiming any best-efforts sessions before reclaiming any streaming sessions and (b) reclaiming any streaming sessions before reclaiming any voice-related sessions. And other preferences/orders are clearly possible.

With respect to how many sessions to reclaim in step 206, one possibility involves reclaiming enough sessions to bring the number of maintained sessions either equal to or below the session-reclamation threshold. Another possibility involves reclaiming a predetermined number of sessions. Still another possibility involves reclaiming sessions in increasing tiers of latency-sensitivity, perhaps until at least a minimum number of sessions have been reclaimed. And many other possibilities abound, without departing from the invention.

b. A Second Exemplary Method

Figure 3:
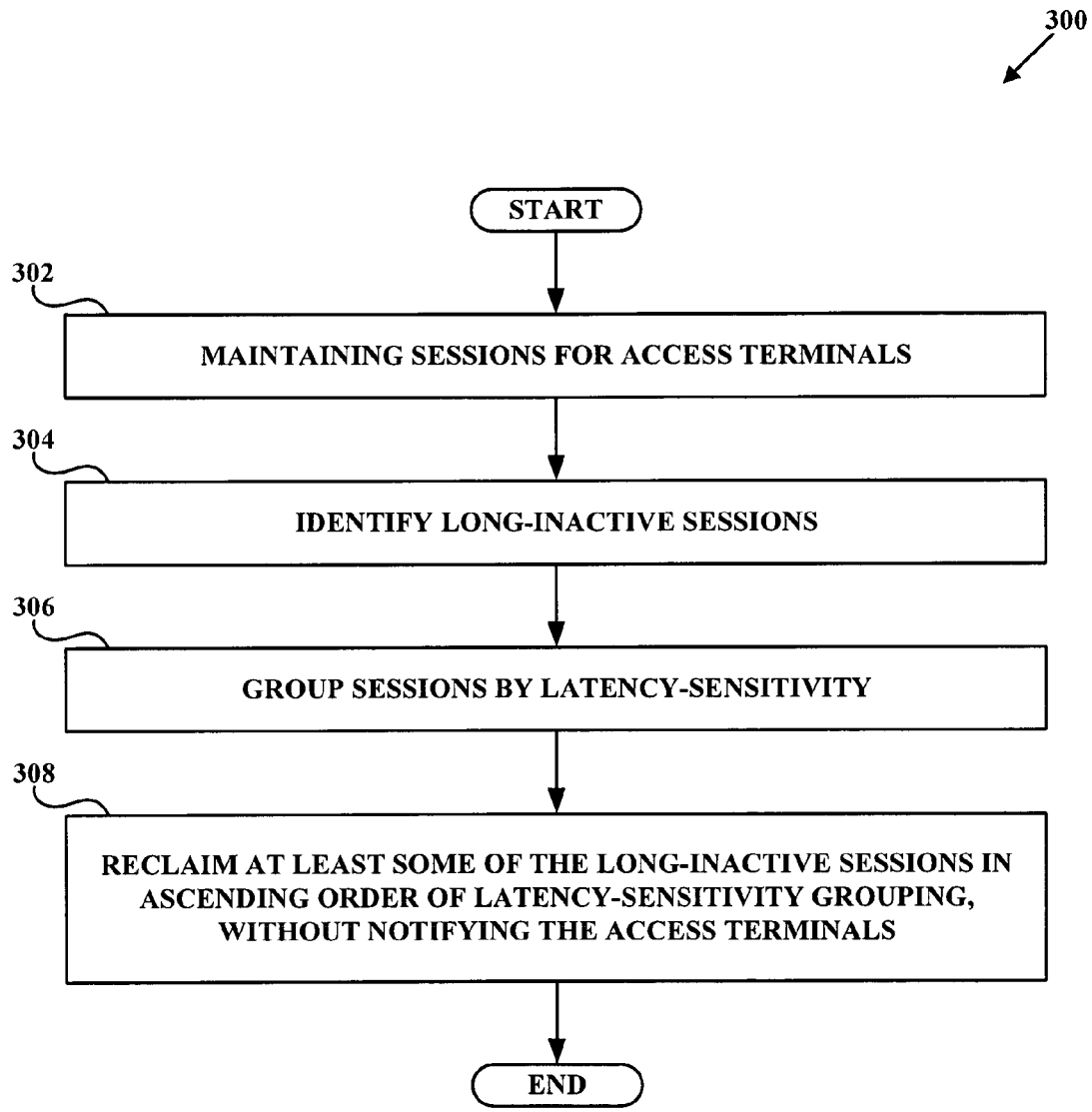
FIG. 3 is a flowchart of a method, in accordance with exemplary embodiments.

FIG. 3 is a flowchart of a second exemplary method, in accordance with an exemplary embodiment. In particular, FIG. 3 depicts a method 300, which may be carried out by an access node such as access node 104, perhaps in cooperation with one or more other entities. Method 300 is similar to method 200, and thus is not described in as great of detail.

As shown in FIG. 3, method 300 begins at step 302, when access node 104 maintains a first set of sessions respectively associated with a first set of access terminals. At step 304, access node 104 identifies a second set of sessions, wherein the second set is a subset of the first set, wherein the second set consists of those sessions in the first set that have been inactive for at least a threshold period of time. Note that this step and method 300 in general may be carried out in response to a determination that a number of sessions being currently maintained exceeds a session-reclamation threshold, or more generally that session-reclamation is warranted.

At step 306, access node 104 groups at least the second set of sessions according to latency-sensitivity, perhaps according to one or more strategies described herein, or according to some other strategy. At step 308, access node 104 reclaims at least a subset of the second set of sessions in ascending order of the latency-sensitivity grouping, without notifying the one or more associated access terminals.

4. Conclusion

Various exemplary embodiments have been described above. Those skilled in the art will understand, however, that changes and modifications may be made to those examples without departing from the scope of the claims.

What is claimed is:

1. A method comprising:
maintaining a plurality of sessions respectively associated with a plurality of access terminals, the plurality of sessions consisting of a first number of sessions, each session having an associated degree of latency-sensitivity;
comparing the first number with a session-reclamation threshold; and
determining that the first number exceeds the session-reclamation threshold, and responsively reclaiming one or more of the sessions that have been inactive for at least a threshold amount of time in ascending order of latency-sensitivity, without notifying the one or more associated access terminals.

2. The method of claim 1, carried out by an Evolution Data Optimized (EV-DO) access node, wherein the access terminals comprise EV-DO access terminals.

3. The method of claim 2, wherein either or both of the access node and the access terminals operate in compliance with (a) IS-856, Revision A or (b) both IS-856, Release 0 and IS-856, Revision A.

4. The method of claim 2, wherein the access node comprises a radio network controller and at least one base transceiver station.

5. The method of claim 1, wherein at least one of the access terminals comprises at least one of a cellular telephone, a personal digital assistant, a computer, a laptop computer, a laptop air card, and a hybrid access terminal.

6. The method of claim 1, wherein reclaiming one or more of the sessions that have been inactive for at least the threshold amount of time in ascending order of latency-sensitivity comprises first reclaiming best-efforts sessions.

7. The method of claim 1, wherein reclaiming one or more of the sessions that have been inactive for at least the threshold amount of time in ascending order of latency-sensitivity comprises reclaiming one or more sessions in an order determined by the most latency-sensitive profile ID associated with each respective session.

8. The method of claim 1, wherein reclaiming one or more of the sessions that have been inactive for at least the threshold amount of time in ascending order of latency-sensitivity comprises reclaiming one or more sessions in an order determined by the most latency-sensitive reservation associated with each respective session.

9. The method of claim 1, wherein reclaiming one or more of the sessions that have been inactive for at least the threshold amount of time in ascending order of latency-sensitivity comprises reclaiming one or more sessions in an order determined by the most latency-sensitive packet flow actually engaged in by the access terminal associated with each respective session.

10. The method of claim 1, wherein reclaiming one or more of the sessions that have been inactive for at least the threshold amount of time in ascending order of latency-sensitivity comprises reclaiming any best-efforts sessions before reclaiming any voice-related sessions.

11. The method of claim 10, wherein voice-related sessions comprises at least one of voice over IP (VoIP) sessions, push to talk (PTT) sessions, and video-telephony sessions.

12. The method of claim 10, wherein voice-related sessions comprises both voice over IP (VoIP) sessions and push to talk (PTT) sessions, and wherein reclaiming one or more of the sessions that have been inactive for at least the threshold amount of time in ascending order of latency-sensitivity comprises reclaiming any VoIP sessions before reclaiming any PTT sessions.

13. The method of claim 10, wherein reclaiming one or more of the sessions that have been inactive for at least the threshold amount of time in ascending order of latency-sensitivity further comprises (a) reclaiming any best-efforts sessions before reclaiming any streaming sessions and (b) reclaiming any streaming sessions before reclaiming any voice-related sessions.

14. The method of claim 1, wherein reclaiming one or more of the sessions that have been inactive for at least the threshold amount of time in ascending order of latency-sensitivity comprises reclaiming enough sessions to bring a number of maintained sessions either equal to or below the session-reclamation threshold.

15. The method of claim 1, wherein reclaiming one or more of the sessions that have been inactive for at least the threshold amount of time in ascending order of latency-sensitivity comprises reclaiming a predetermined number of sessions.

16. The method of claim 1, wherein reclaiming one or more of the sessions that have been inactive for at least the threshold amount of time in ascending order of latency-sensitivity comprises reclaiming sessions in increasing tiers of latency-sensitive sessions.

17. The method of claim 16, wherein reclaiming one or more of the sessions that have been inactive for at least the threshold amount of time in ascending order of latency-sensitivity further comprises reclaiming sessions until at least a minimum number of sessions have been reclaimed.

18. The method of claim 1, wherein reclaiming a given session comprises at least one of revoking a Universal Access Terminal Identifier (UATI) associated with the given session, deleting session data associated with the given session, and marking as invalid session data associated with the given session.

19. An Evolution Data Optimized (EV-DO) access node comprising:
  a wireless-communication interface for providing an EV-DO coverage area;
  a processor; and
  data storage comprising instructions executable by the processor for:
    maintaining a plurality of sessions respectively associated with a plurality of access terminals, the plurality of sessions consisting of a first number of sessions, each session having an associated degree of latency-sensitivity;
    comparing the first number with a session-reclamation threshold; and
    determining that the first number exceeds the session-reclamation threshold, and responsively reclaiming one or more of the sessions that have been inactive for at least a threshold amount of time in ascending order of latency-sensitivity, without notifying the one or more associated access terminals.

* * * * *